US010809539B2

(12) United States Patent
Yamagishi et al.

(10) Patent No.: US 10,809,539 B2
(45) Date of Patent: Oct. 20, 2020

(54) ILLUMINATION APPARATUS PROVIDED WITH TWO LASER LIGHT SOURCE UNITS ARRANGED TO OPPOSE EACH OTHER

(71) Applicant: Panasonic Intellectual Property Management Co., Ltd., Osaka (JP)

(72) Inventors: Shigekazu Yamagishi, Osaka (JP); Yuki Yamagata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/375,079

(22) Filed: Apr. 4, 2019

(65) Prior Publication Data
US 2019/0310539 A1 Oct. 10, 2019

(30) Foreign Application Priority Data
Apr. 9, 2018 (JP) ................................. 2018-074909

(51) Int. Cl.
*G02B 27/14* (2006.01)
*G03B 21/20* (2006.01)
*G02B 27/09* (2006.01)

(52) U.S. Cl.
CPC ....... *G02B 27/143* (2013.01); *G02B 27/0977* (2013.01); *G02B 27/147* (2013.01);
(Continued)

(58) Field of Classification Search
CPC ............ G03B 21/2013; G03B 21/2033; G03B 21/204; G03B 21/2066; G02B 27/141;
(Continued)

(56) References Cited

U.S. PATENT DOCUMENTS 7,271,961 B2 * 9/2007 Manabe ............. G02B 27/1026
348/338
8,752,981 B2 * 6/2014 Huang ................. G02B 27/102
362/235

(Continued)

FOREIGN PATENT DOCUMENTS

JP 2001-201807 7/2001
JP 2007-322792 12/2007
(Continued)

*Primary Examiner* — Bao-Luan Q Le
(74) *Attorney, Agent, or Firm* — Wenderoth, Lind & Ponack, L.L.P.

(57) ABSTRACT

An illumination apparatus includes first and second laser light source units, each of which is configured by juxtaposing a plurality of laser light sources in an array, and which are provided to oppose each other. The illumination apparatus further includes first and second reflecting members. The second reflecting member has a first gap and is divided into first and second reflecting portions, and the first reflecting member is disposed so as to pass through the first gap. A second outgoing light beam transmitted through a transmitting region of the first reflecting member and a fourth outgoing light beam transmitted through a transmitting region of the second reflecting member are reflected in an output light direction by a reflecting region of the second reflecting member and a reflecting region of the first reflecting member, respectively.

13 Claims, 12 Drawing Sheets

(52) U.S. Cl.
CPC ....... *G03B 21/204* (2013.01); *G03B 21/2013* (2013.01); *G03B 21/2033* (2013.01); *G03B 21/2066* (2013.01); *G02B 27/0972* (2013.01); *G02B 27/141* (2013.01); *G02B 27/146* (2013.01); *G02B 27/149* (2013.01)

(58) Field of Classification Search
CPC .. G02B 27/146; G02B 27/149; G02B 27/143; G02B 27/0977; G02B 27/147
See application file for complete search history.

(56) References Cited

U.S. PATENT DOCUMENTS

| | | | | |
|---|---|---|---|---|
| 8,842,705 | B2* | 9/2014 | Janssens | G02B 27/0961 |
| | | | | 372/34 |
| 9,004,699 | B2* | 4/2015 | Huang | G02B 27/141 |
| | | | | 353/37 |
| 2006/0250584 | A1* | 11/2006 | Manabe | G02B 27/1026 |
| | | | | 353/33 |
| 2012/0275146 | A1* | 11/2012 | Huang | G02B 27/141 |
| | | | | 362/230 |
| 2012/0275149 | A1* | 11/2012 | Huang | G02B 27/102 |
| | | | | 362/235 |
| 2013/0100974 | A1* | 4/2013 | Janssens | G02B 27/0961 |
| | | | | 372/35 |
| 2014/0354956 | A1* | 12/2014 | Yamada | H04N 9/3152 |
| | | | | 353/20 |
| 2016/0334695 | A1* | 11/2016 | Yamada | G03B 21/2013 |
| 2017/0315430 | A1* | 11/2017 | Wang | G02B 26/008 |
| 2017/0343891 | A1* | 11/2017 | Sakata | G03B 21/204 |
| 2017/0351167 | A1* | 12/2017 | Wu | F21V 7/0066 |
| 2019/0086779 | A1* | 3/2019 | Chang | G02B 27/108 |

FOREIGN PATENT DOCUMENTS

| | | |
|---|---|---|
| JP | 2008-116581 | 5/2008 |
| JP | 2010-102049 | 5/2010 |
| JP | 2016-18594 | 2/2016 |

* cited by examiner

ILLUMINATION APPARATUS PROVIDED WITH TWO LASER LIGHT SOURCE UNITS ARRANGED TO OPPOSE EACH OTHER

CROSS REFERENCE TO RELATED APPLICATIONS

This is an application, which claims priority to Japanese patent application No. JP 2018-074909 as filed Apr. 9, 2018, the contents of which are incorporated herein by reference.

BACKGROUND OF THE INVENTION

1. Field of the Invention

The present disclosure relates to an illumination apparatus, an illumination system, and a projection type image display apparatus.

2. Description of Related Art

Regarding a light source of a projection type image display apparatus, due to advances in solid state light source technology, a conventional discharge tube lamp has been replaced with an LED light source or a laser light source having advantages of being long-life, containing no mercury, no explosion, and the like. In particular, with respect to the laser light source, since light output from an individual light source is small and the etendue of the light output is relatively small, a plurality of the light sources unitized in an array is used as a light source. A high power projector of more than 5000 lumens is also commercialized.

The above-described laser light source is generally housed in a tubular package, and cooling is required for keeping the laser light source at a constant temperature from the viewpoint of securing output and life thereof. Accordingly, the laser light sources are arranged two-dimensionally at constant intervals.

On the other hand, in case of realising high output, the number of laser light source units to be used becomes large. When the laser light source units are arranged two-dimensionally as they are, it takes a very large area. As a result, an optical system handling an outgoing light beam is also enlarged, and this leads to causing problems of lowering light collection efficiency and increasing a size of an entire apparatus. Therefore, it is a problem to provide an optical system, which is small and focuses light beams from laser units at high density. In view of this problem, the following proposals have been hitherto been made.

In Patent Document 1, a light beam from a lump is transmitted through a a2 reflector and a lens array, and then the transmitted light beam is divided into a plurality of light beams. Then, after each of the divided light beams is alternately reflected and transmitted, the light beams are synthesized by a mirror.

In addition, in Patent Document 2, it is proposed that light beams from a plurality of laser light source arrays having different wavelengths of outgoing light beams are synthesized into a unidirectional light beam by a wavelength selective mirror.

In Patent Document 1, an incident light beam from light sources arranged in an a3 array incident from a certain direction is incident on and reflected by a reflecting region provided in a band shape on a flat glass obliquely disposed with respect to the incident light beam. On the other hand, an incident light beam from light sources arranged in an array entering from a direction orthogonal to the above direction enters and passes through a transmitting region provided in a band shape on the flat glass. Then, the output intensity of an outgoing light beam is increased by combining outgoing directions of the two light beams from the above two directions. However, it is impossible to synthesize light beams from light source units disposed opposing each other.

In addition, in Patent Document 2 a mirror having a function of reflecting and transmitting a light beam according to a wavelength of an incident light beam is used for synthesizing light beams from light sources. However, when synthesizing light beams of the same wavelength, it is not effective to increase output intensity of an outgoing light beam.

It is an object of the present disclosure to provide an illumination apparatus or an illumination system that can synthesize light beams from light source units disposed opposing each other and increases output intensity of an outgoing light beam compared with the prior art, and a projection type image display apparatus using the illumination apparatus or the illumination system.

SUMMARY OF THE INVENTION

According to one aspect of the present disclosure, there is provided an illumination apparatus including first and second laser light source units, each of which is configured by juxtaposing a plurality of laser light sources in an array, and which are provided so as to oppose each other. The illumination apparatus includes first and second reflecting members.

The first reflecting member is disposed so as to incline with respect to a plurality of outgoing tight beams from the first and second laser light source units. The first reflecting member alternately has, in a juxtaposition direction, a reflecting region reflecting a first outgoing light beam of the plurality of outgoing light beams in a predetermined output light direction and a transmitting region transmitting a second outgoing light beam of the plurality of outgoing light beams.

The second reflecting member is disposed so as to be orthogonal to the first reflecting member. The second reflecting member alternately has, in the juxtaposition direction, a reflecting region reflecting a third outgoing light beam of the plurality of outgoing light beams in the output light direction and a transmitting region transmitting a fourth outgoing light beam of the plurality of outgoing light beams.

The second reflecting member has a predetermined first gap and is divided into first and second reflecting portions, and the first reflecting member is disposed so as to pass through the first gap.

The second outgoing light beam transmitted through the transmitting region of the first reflecting member and the fourth outgoing light beam transmitted through the transmitting region of the second reflecting member are reflected in the output light direction by the reflecting region of the second reflecting member and the reflecting region of the first reflecting member, respectively, and this leads to that the reflected light beams are emitted in the output light direction.

Therefore, in accordance with the illumination apparatus or the like according to the present disclosure, it is possible to synthesize the light beams of the same wavelength from the light source units disposed opposing each other and increase output intensity of an outgoing light beam compared with the prior art.

EMBODIMENTS

Figure 1A:
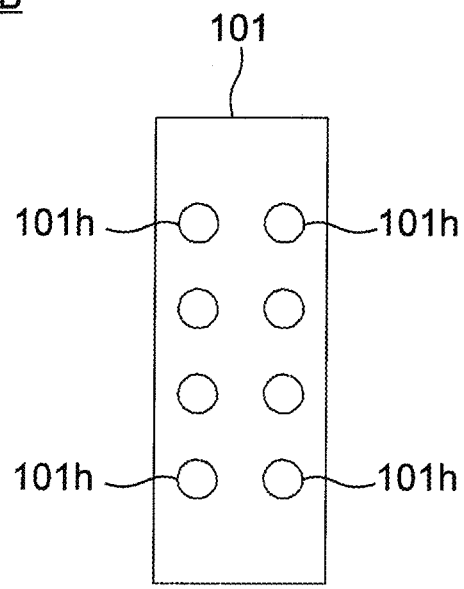
FIG. 1A is a front view of a laser light source unit 100 used in an illumination apparatus according to a first embodiment.
Figure 1B:
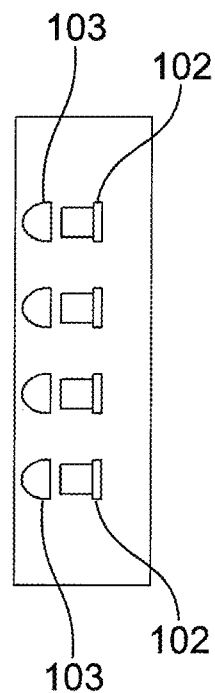
FIG. 1B is a see-through side view of the laser light source unit 100 of FIG. 1A.
Figure 2:
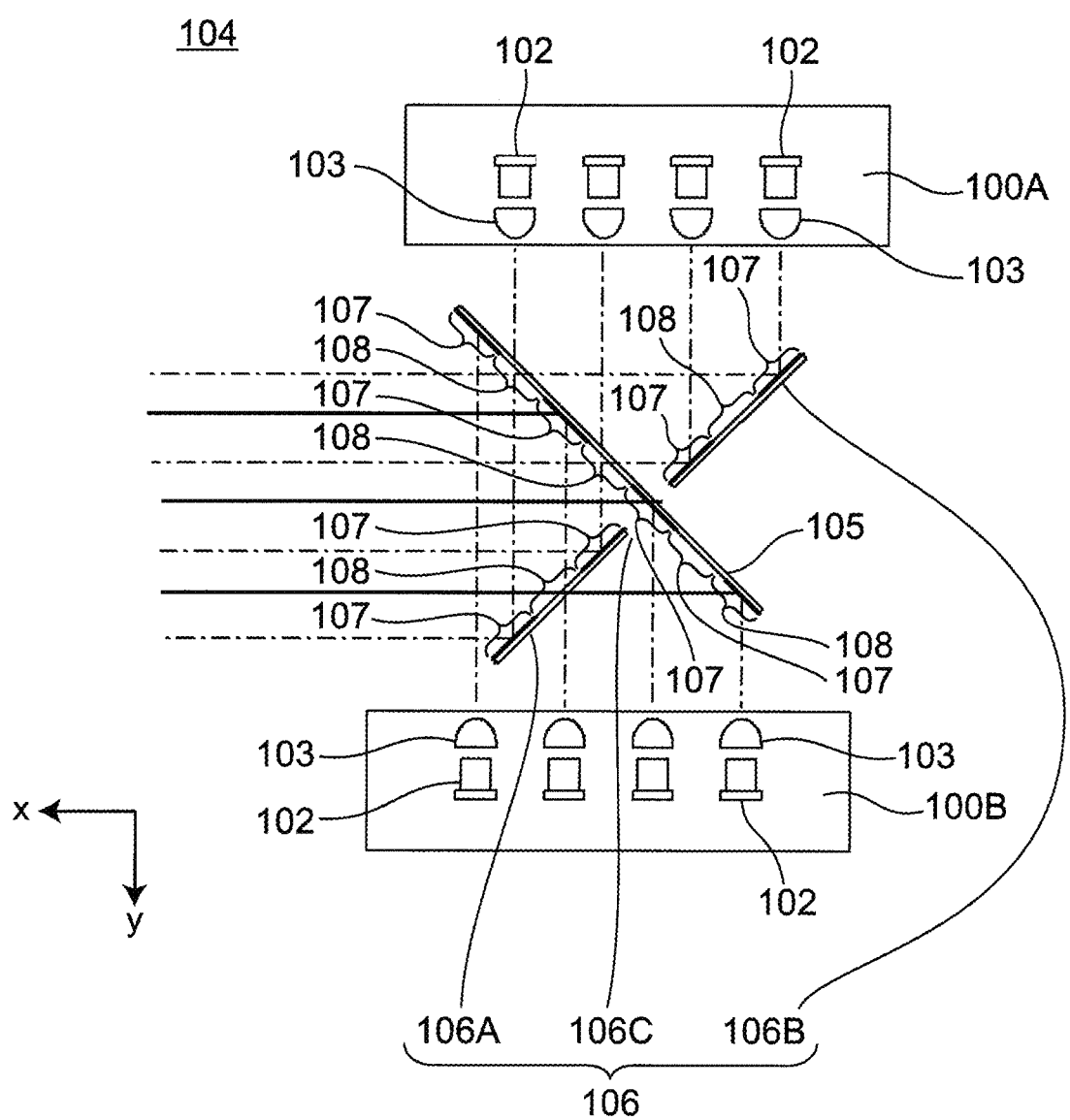
FIG. 2 is a plan view showing a configuration example of the illumination apparatus according to the first embodiment.

Hereinafter, embodiments will be described with reference to the drawings. It in noted that, in each of the following embodiments, the same components are denoted by the same reference numerals. The present embodiments relate to an illumination apparatus that realizes a small light source apparatus by arranging light beams from a plurality of laser light source units with high density with a simple configuration, and a projection type image display apparatus using the illumination apparatus.
First Embodiment FIG. 1A is a front view of a laser light source unit 100 used for an illumination apparatus 104 according to a first embodiment, and FIG. 1B is a see-through side view of the laser light source unit 100 of FIG. 1A. In addition, FIG. 2 is a plan view showing a configuration example of the illumination apparatus 104 according to the first embodiment. It is noted that an xy plane is a horizontal plane.

Referring to FIG. 1A, laser light source units 100A and 100B have the same configuration, and each have a plurality of two-dimensional (may be one-dimensional) emission holes 101h arranged in an array on a front surface of a casing 101 made of a thermally conductive material. As shown in a see-through manner of FIG. 1B, in the casing 101, for example, a laser light source 102 that emits blue light and a collimator lens 103 that converts an outgoing tight beam from the laser light, source 102 into parallel light and emits it through the emission hole 101h are paired. A plurality of the pairs is fixed and mounted to the casing 101 in an array.

Referring to FIG. 2, the illumination apparatus 104 according to the first embodiment includes:

(1) the laser light source unit 100A;

(2) the laser light source unit 100B disposed opposing the laser light source unit 100A;

(3) a mirror 105, which is a reflecting member obliquely disposed with respect to outgoing light beams from the laser light source units 100A and 100B. In this case, the mirror 105 has a plurality of reflecting regions 107 reflecting an incident laser light beam of a predetermined wavelength and transmitting regions 108 transmitting an incident laser light beam of a predetermined wavelength light; and (4) a mirror 106, which is a reflecting member disposed orthogonally to the mirror 105, where the mirror 106 has a plurality of reflecting regions 107 and a plurality of transmitting regions 108.

It should be noted that the mirror 106 is configured by including mirror portions 106A and 106B, which are divided into two with a predetermined gap 106C at a substantially central portion thereof. In addition, an optical axis of a laser light beam emitted from each laser light source 102 of the laser light source unit 100A and an optical axis of a laser light beam emitted from each laser light source 102 of the laser light source unit 100B are parallel to each other. The plurality of laser light sources 102 is disposed shifted in a horizontal juxtaposition direction by, for example, ½ of an arrangement interval between the laser light sources 102 so as not to coincide and overlap with each other on the identical horizontal plane (including a beam width).

In the illumination apparatus configured as described above, the laser light beam emitted from each laser light source 102 of the laser light source unit 100A advances in a +y direction.

(1) After passing through the transmitting region 108 of the mirror 105, the transmitted light beam is reflected by 90 degrees by the reflecting region 107 of the mirror portion 106A or 106B of the mirror 106, or (2) after being reflected by the reflecting region 107 of the mirror portion 106A or 106B of the mirror 106 by 90 degrees, the reflected light beam passes through the transmitting region 108 of the mirror 105.

Next, the transmitted light beam and the reflected light beam further advance in a +x direction.

In addition, the laser light beam emitted from each laser light source 102 of the laser light source unit 100B advances in a −y direction.

(1) The light beam passes through or does not pass through the transmitting region 108 of the mirror portion 106A or 106B of the mirror 106, and thereafter the light beam is reflected by 90 degrees by the reflecting region 107 of the mirror 105, or (2) after being reflected by the reflecting region 107 of the mirror 105 by 90 degrees, the reflected light beam passes through the transmitting region 108 of the mirror portion 106A or 106B of the mirror 106.

The light beam and the reflected light beam then further travel in the +x direction.

In the illumination apparatus configured as described above, the light beam emitted from the laser light source 102 of the laser light source unit 100B is reflected by the reflecting region 107 of the mirror portion 105 and guided in the +x direction. In this case, there is a gap 106C between the minor portion 106A and the mirror portion 105, and a light beam passing through the gap 106C along an optical axis 110 is guided without loss. In particular, the gap 106C needs to satisfy the following condition.

Figure 3:
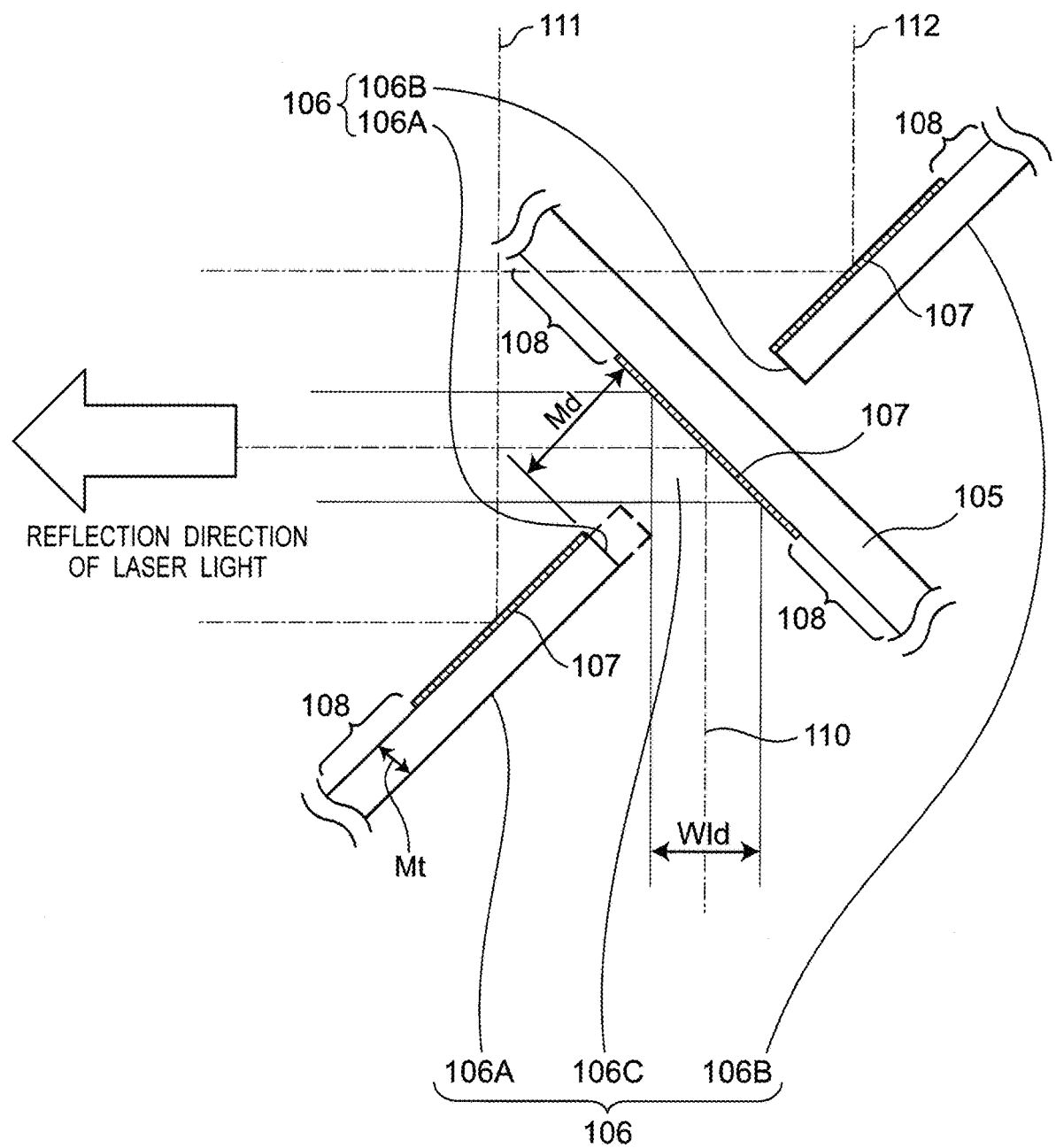
FIG. 3 is a plan view showing an arrangement relationship between a mirror 105 and mirror portions 106A and 106B of a mirror 106 in the illumination apparatus 104 of FIG. 2.

FIG. 3 is a plan view showing an arrangement relationship between the mirror 105 and the mirror portions 106A, 106B of the mirror 106 in the illumination apparatus 104 of FIG. 2. It is noted that a reflection direction of the laser light beam is an output light direction of the illumination apparatus 104. In FIG. 3, definitions are made as follows:

Md: a distance from an inner end surface of the mirror portion 106A to a surface of the mirror 105;

Mt: a plate thickness of the mirror portion 106A; and

Wld: an effective width of each of the laser light beams of the laser light source units 100A and 100B.

In this case, the gap 106C needs to satisfy the condition of the following equation (1):

$$Md \geq \frac{Mt}{2} + \frac{W1d}{\sqrt{2}}. \qquad (1)$$

In ease of further increasing the gap Md, it is necessary to check whether or not a reflecting region of a light beam traveling on an optical axis 111 is damaged. In addition, a gap between an inner end surface of the mirror portion 106B and a back surface of the mirror 105 is also ensured, and it is necessary to secure at least the reflecting region 107 for reflecting a light beam traveling on an optical axis 112 among the outgoing light beams of the laser light source unit 100A.

In the first embodiment shown in FIG. 2, the mirror 106 is disposed such that the gap 106C is located in the reflecting region 107 of the mirror 105, which reflects one outgoing light beam from the laser light source unit 100B.

Figure 4:
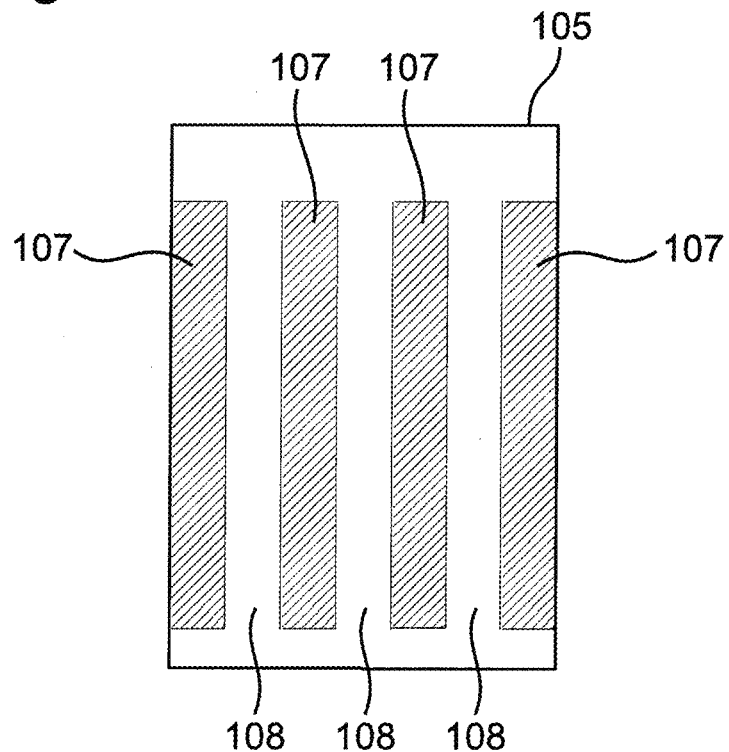
FIG. 4 is a front view showing a configuration example of the mirror 105 of FIG. 2.
Figure 5:
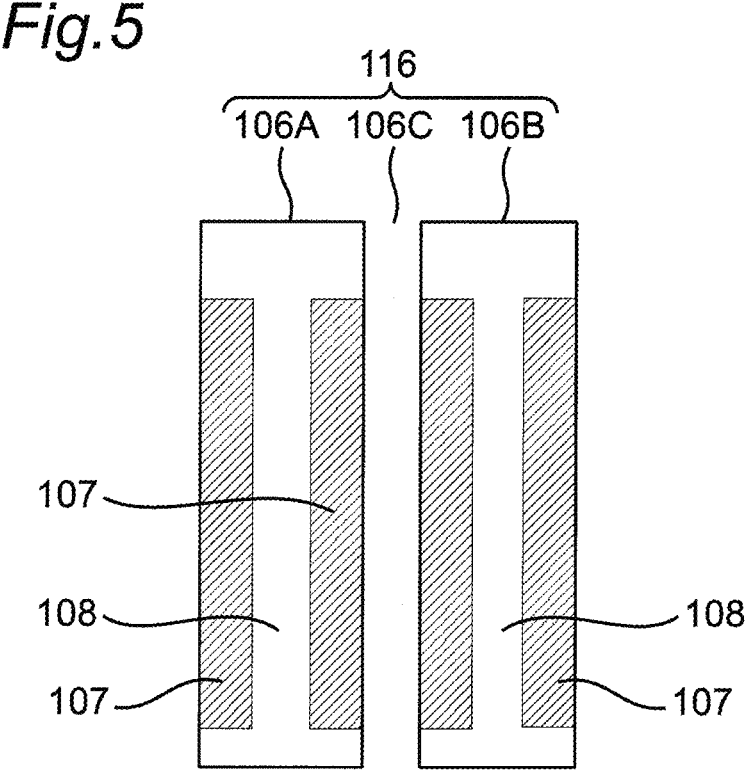
FIG. 5 is a front view showing a configuration example of the mirror 106 of FIG. 2.

FIG. 4 is a front view showing a configuration example of the mirror 105 of FIG. 2, and FIG. 5 is a front view showing a configuration example of the mirror 106 of FIG. 2.

Referring to FIG. 4, the mirror 105 has a plurality of reflecting regions 107 each extending in a strip shape with a predetermined width in a vertical direction, and has a transmitting region 108 between the adjacent reflecting regions 107. It is noted that the reflecting region 107 of the mirror 105 can be formed by forming a deposition film having reflection characteristics on a substrate glass. Specifically, the mirror 105 can be easily manufactured by masking with a jig having an opening only in the reflecting region 107 to form the deposition film.

As is apparent from FIGS. 4 and 5, the reflecting region 107 and the transmitting region 108 each have a strip shape having a longitudinal direction with respect to the vertical direction. Accordingly, when a beam width of each of the laser light beams of the laser light source units 100A and 100B is larger in the vertical direction than in the horizontal direction, the laser light sources 102 of the laser light source units 100A and 100B can be disposed by narrowing an adjacent distance therebetween in the horizontal direction. This contributes to miniaturization of the illumination apparatus 104.

Conventionally, there is an optical system, in which a pair of reflecting mirrors are disposed to be orthogonal to each other. However, it is a challenge to ensure productivity while suppressing "vignetting" of incident light by suppressing a gap at an intersecting portion as much as possible. According to the first embodiment of the present disclosure, in the laser light source units 100A and 100B, the laser light sources 102 are discretely disposed at predetermined intervals. Due to the configuration of the laser light source 102 and the collimator lens 103, diffusion of the outgoing light is small and the light beam width can be maintained within the predetermined width. The above productivity can be realized by clearly securing an interval width between the orthogonal mirrors 105 and 106. Then, by disposing the laser light source units 100A and 100B so as to oppose each other, it is possible to increase a degree of freedom of constructing the optical system as compared with the prior art and to contribute to miniaturization of the entire apparatus.

As described above, according to the present embodiment, the light beams having the same wavelength from the laser light source units disposed opposing each other can be synthesized, and output intensity of the outgoing light beam can be made higher than that of the prior art.

It is noted the light beam from the laser light source unit 100A and the light beam from the laser light source unit 100B are synthesized by being reflected by the different reflecting regions 107 of the mirrors 105 and 106, respectively. Therefore, the wavelength of the light beam from each of the laser light source units 100A, 100B can be freely set if it is appropriately selected according to the characteristics of the reflecting region 107.

Figure 6:
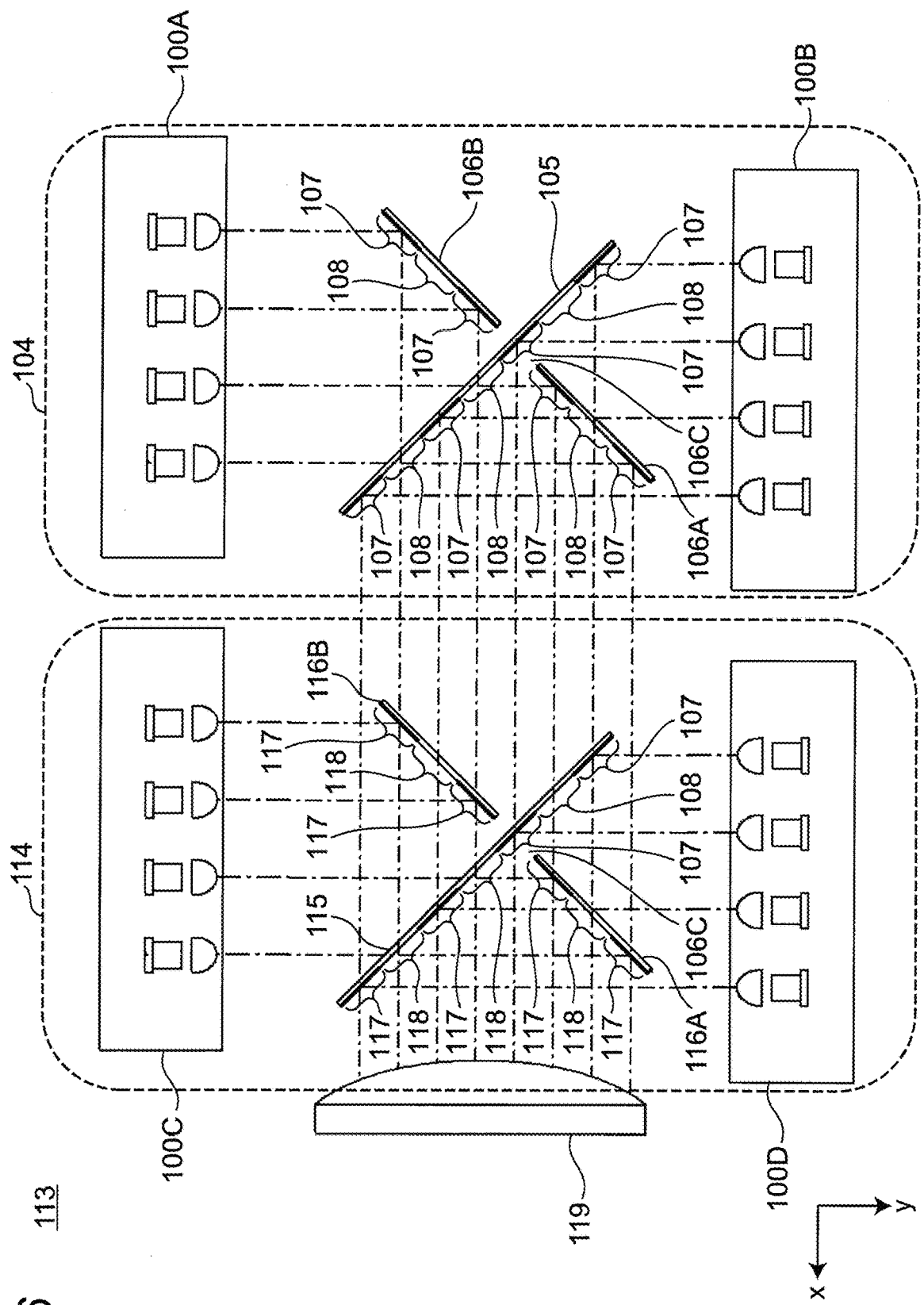
FIG. 6 is a plan view showing a configuration example of an illumination apparatus 113 according to a modified embodiment of the first embodiment.

FIG. 6 is a plan view showing a configuration example of an illumination apparatus 113 according to a modified embodiment of the first embodiment. The illumination apparatus 113 according to the modified embodiment of the first embodiment of FIG. 6 is a configuration example for further increasing output intensity as compared with the illumination apparatus 104 according to the first embodiment. As compared with the illumination apparatus 104 according to the first embodiment of FIG. 2, in the illumination apparatus 113 according to the modified embodiment of the first embodiment of FIG. 6, (1) an illumination apparatus 114 is disposed on an outgoing side of the illumination apparatus 104.

(2) A lens 119 is placed on an outgoing side of the illumination apparatus 114.

Hereinafter, differences will be described in detail.

Referring to FIG. 6, the illumination, apparatus 114 includes:

(1) a pair of laser light source units 100C and 100D opposing each other, and whose optical axis is shifted by a predetermined distance, in a manner similar to that of the laser light source units 100A and 100B of the illumination apparatus 104;

(2) mirror portions 116A and 116D of a mirror 116, in a manner similar to that of the mirror portions 106A and 106B of the mirror 106; and (3) a mirror 115, in a manner similar to that of the mirror 105.

Figure 7:
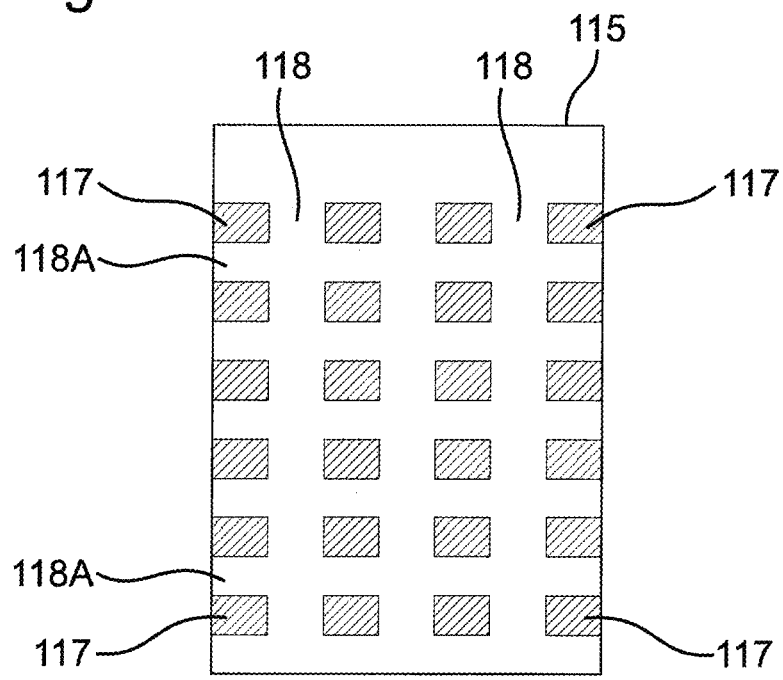
FIG. 7 is a front view showing a configuration example of a mirror 115 of FIG. 6.

However, formation regions of reflecting regions 117 of the mirrors 115 and 116 are different from those shown in FIGS. 4 and 5 in the following two points. FIG. 7 is a front view showing a configuration example of the mirror 115 of FIG. 6 and FIG. 8 is a front view showing a configuration example of the mirror 116 of FIG. 6.

(Difference 1) An interval is secured between the mirror 115 and the mirror portion 116B so that light entering from a back surface is not kicked.

Figure 8:
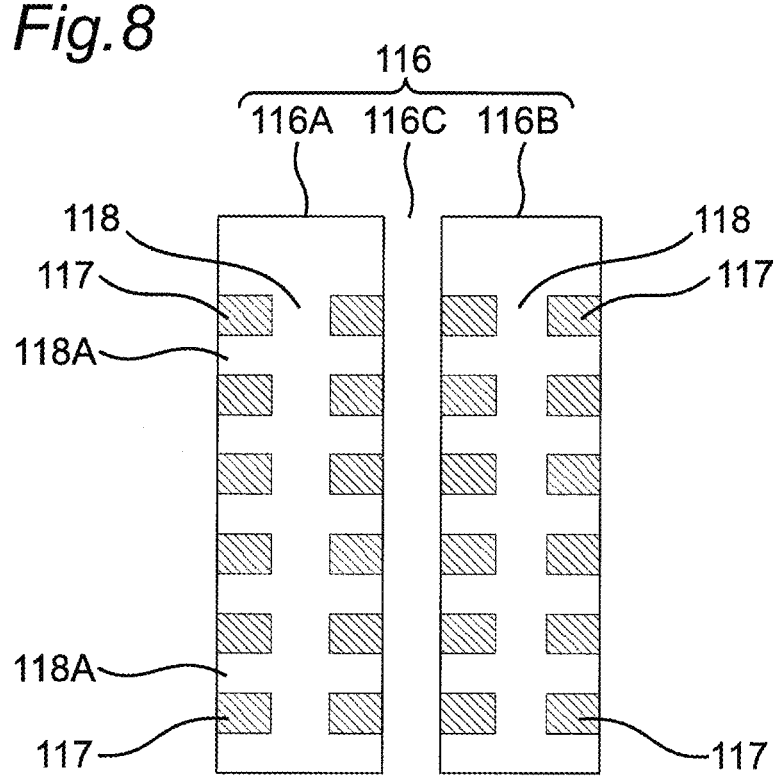
FIG. 8 is a front view showing a configuration example of a mirror 116 of FIG. 6.

(Difference 2) As shown in FIGS. 7 and 8, in the mirror 115 and the mirror 116, a plurality of transmitting regions 118A with predetermined intervals 11, through which light from the illumination apparatus 104 passes, is formed between the reflecting regions 117, which are adjacent to each other in the vertical direction. It is noted that the number of reflecting regions 117 and transmitting regions 118 of FIGS. 7 and 8 is an example.

According to the illumination apparatus 113 of FIG. 6 configured as described above, it is possible to obtain output intensity twice the output intensity of the illumination apparatus 104.

Figure 9:
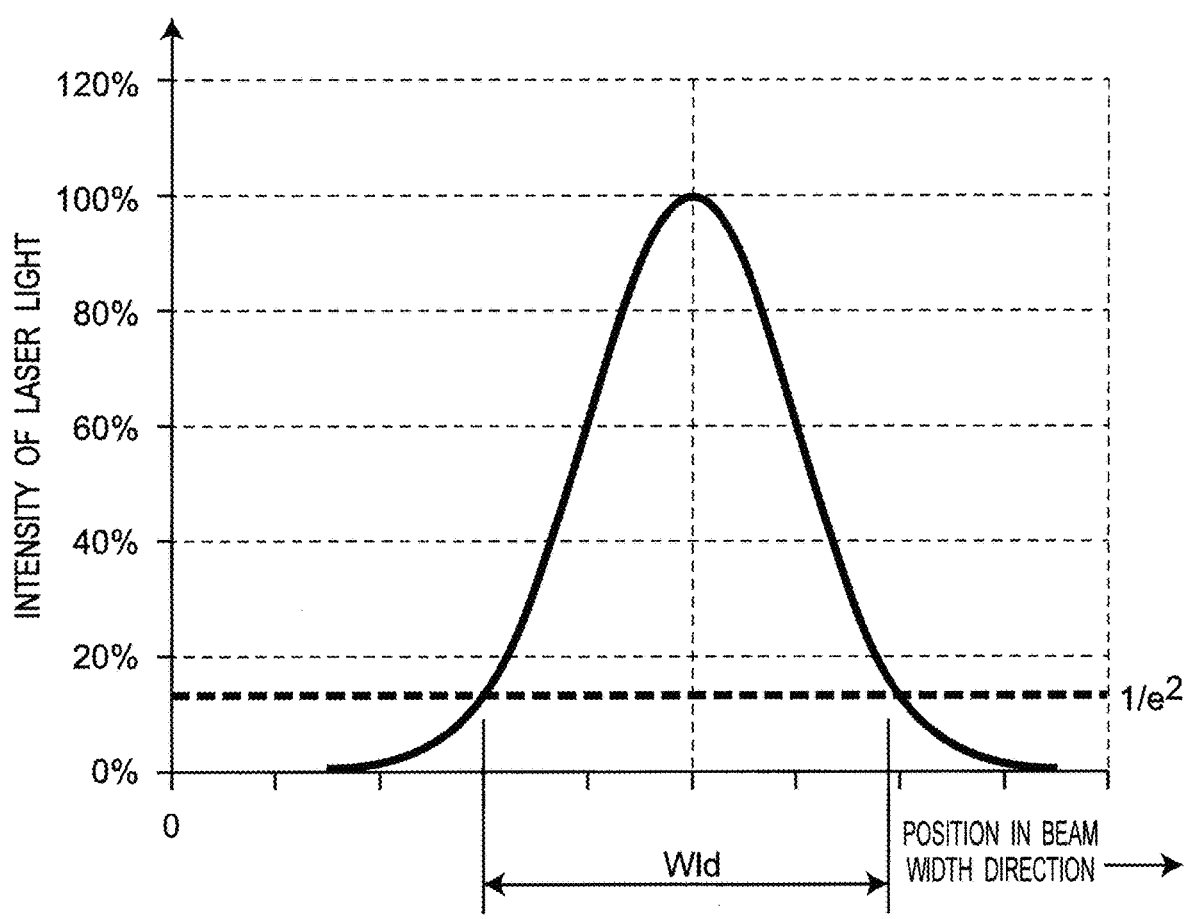
FIG. 9 is a graph showing positional characteristics in a beam width direction of intensity of laser light beams emitted from laser light sources used in the first embodiment.

FIG. 9 is a graph showing positional characteristics in a beam width direction of intensity of laser light beams emitted from the laser light sources 102 used in the first embodiment. In other words, FIG. 9 defines the width Wld in the above equation (1), and a beam width having intensity of $1/e^2$ of peak intensity of the laser light source is the width Wld. In this case, "e" represents a Napier's constant, and is a definition commonly used when handling laser light.

As described above, according to the present embodiment, depending on the reflecting regions 107, 117 and the transmitting regions 108, 118 of the mirrors 105, 106, 115, and 116, the laser light beams are reflected or transmitted, and then, are synthesized. Therefore, the wavelengths of the light beams from the laser light sources 102 used may be the same or different.

As described above, according to the present embodiment, the laser light source units 100A and 100B (100C and 100 D), in which the plurality of laser light sources 102 is arranged in the array, are disposed opposing each other, and the mirrors 105 and 106 (115 and 116) are disposed therebetween. Then, the illumination apparatus 104 (113) can be made small as a whole with a simple configuration, and also, it is possible to provide the illumination apparatus 104 (113) where each member can be realized relatively inexpensively. In addition, it is possible to realize a small projection type image display apparatus using the illumination apparatus 104 (113).

Second Embodiment

Figure 10:
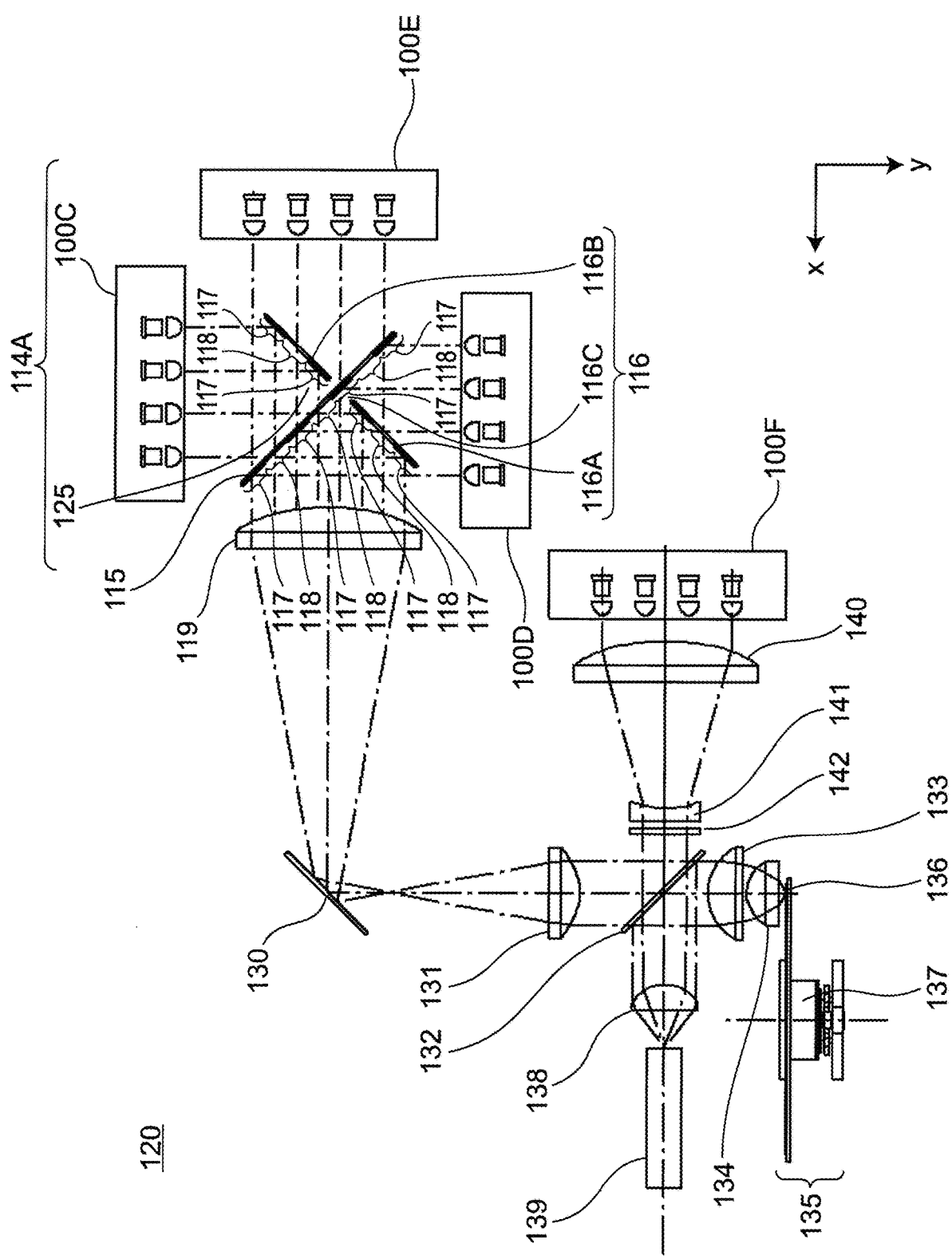
FIG. 10 is a plan view showing a configuration example of an illumination apparatus 120 according to a second embodiment.

FIG. 10 is a plan view showing a configuration example of an illumination apparatus 120 according to a second embodiment. Referring to FIG. 10, the illumination apparatus 120 according to the second embodiment includes:

(1) an illumination apparatus 114A illustrated in an upper right of FIG. 10; and (2) an optical system from a mirror 130 to a rod integrator 139 disposed in a rear stage of the illumination apparatus 114A.

Referring to FIG. 10, the illumination apparatus 114A includes:

(1) an illumination apparatus 114 having laser light source units 100C and 100D and mirrors 115 and 116 and having the same configuration as the illumination apparatus 114 of FIG. 6;

(2) a laser light source unit 100E (an optical axis of which is the same as an output optical axis of the illumination apparatus 104) provided in a front stage of the illumination apparatus 114 in place of the illumination apparatus 104 of FIG. 6; and (3) a lens 119 provided in a rear stage of the illumination apparatus 114.

It is noted that the laser light beams from the three laser light source units 100C, 100D, and 100E have wavelengths of blue or a color close to the blue, and are reflected by or passed through the mirrors 115 and 116 and then synthesized. The synthesized laser light beam has high output intensity, is synthesized with high density in a predetermined limited range, and is emitted in a +x direction.

Hereinafter, the optical system from the mirror 130 to the rod integrator 139 disposed in the rear stage of the illumination apparatus 114A will be described.

The blue laser light beam emitted from the illumination apparatus 114A in the +x direction is reflected by the mirror 130 from the lens 119, and then becomes substantially parallel light by a condenser lens 131 and enters a dichroic mirror 132. The dichroic mirror 132 has a characteristic of transmitting blue light and reflecting other color light. Therefore, the dichroic mirror 132 transmits the incident blue light, and then the light enters a phosphor portion 136 of a phosphor wheel apparatus 135 via condenser lenses 133 and 134.

The phosphor portion 136 of the phosphor wheel apparatus 135 is formed on an outer edge portion of a circular substrate made of a thermally conductive material and having a reflection layer on a back surface. The circular substrate can be rotated by a motor 137 provided at a center. As the blue light is incident on the phosphor portion 136, the blue light is converted into yellow light. Then, the converted yellow light is reflected by the reflection layer formed on the back surface of the circular substrate. The reflected yellow light enters the dichroic mirror 132 via the condenser lenses 134 and 133. After it is reflected by the dichroic mirror 132, the yellow light is converged on an incident surface of the rod integrator 139 having a rectangular opening via a lens 138.

On the other hand, blue light from a laser light source unit 100F having the same configuration as the laser light source units 100C to 100E is emitted in the +x direction, and then converged by a lens 140 provided in front of the laser light source unit 100F. The converged blue light is converted into substantially parallel light by a lens 141, and then enters the dichroic mirror 132 via a diffusion plate 142. The dichroic mirror 132 transmits the blue light and reflects the other color light. The transmitted blue light passes through the lens 138, and is converged on the incident surface of the rod integrator 139 having the rectangular opening. It is noted that the diffusion plate 142 is provided for diffusing laser light to improve non-uniform light amounts and speckles of outgoing light.

In the illumination apparatus 120 configured as described above, the outgoing light from the rod integrator 139 can obtain white light by adding the yellow light and the blue light. With the configuration of the illumination apparatus 120, the light beams from the plurality of laser light sources are synthesized with high efficiency by using the plurality of blue semiconductor laser light sources, where one laser unit has comparatively high efficiency but insufficient output intensity. Then, this leads to that the illumination apparatus with high output intensity can be made compact as compared with the prior art. In addition, as shown in the illumination apparatus 114A according to the present embodiment, by using the synthesized mirror unit composed of the mirrors 115 and 116, it is possible to further improve light density of illumination light.

In the present embodiment, the excitation light is blue light and the phosphor is yellow. However, the present disclosure is not limited to this. In the present embodiment, it is also possible to select a phosphor that can obtain a fluorescence wavelength of light finally obtained, and to use a laser light source unit having characteristics of emitting excitation light of a preferable wavelength to the phosphor.

Figure 11:
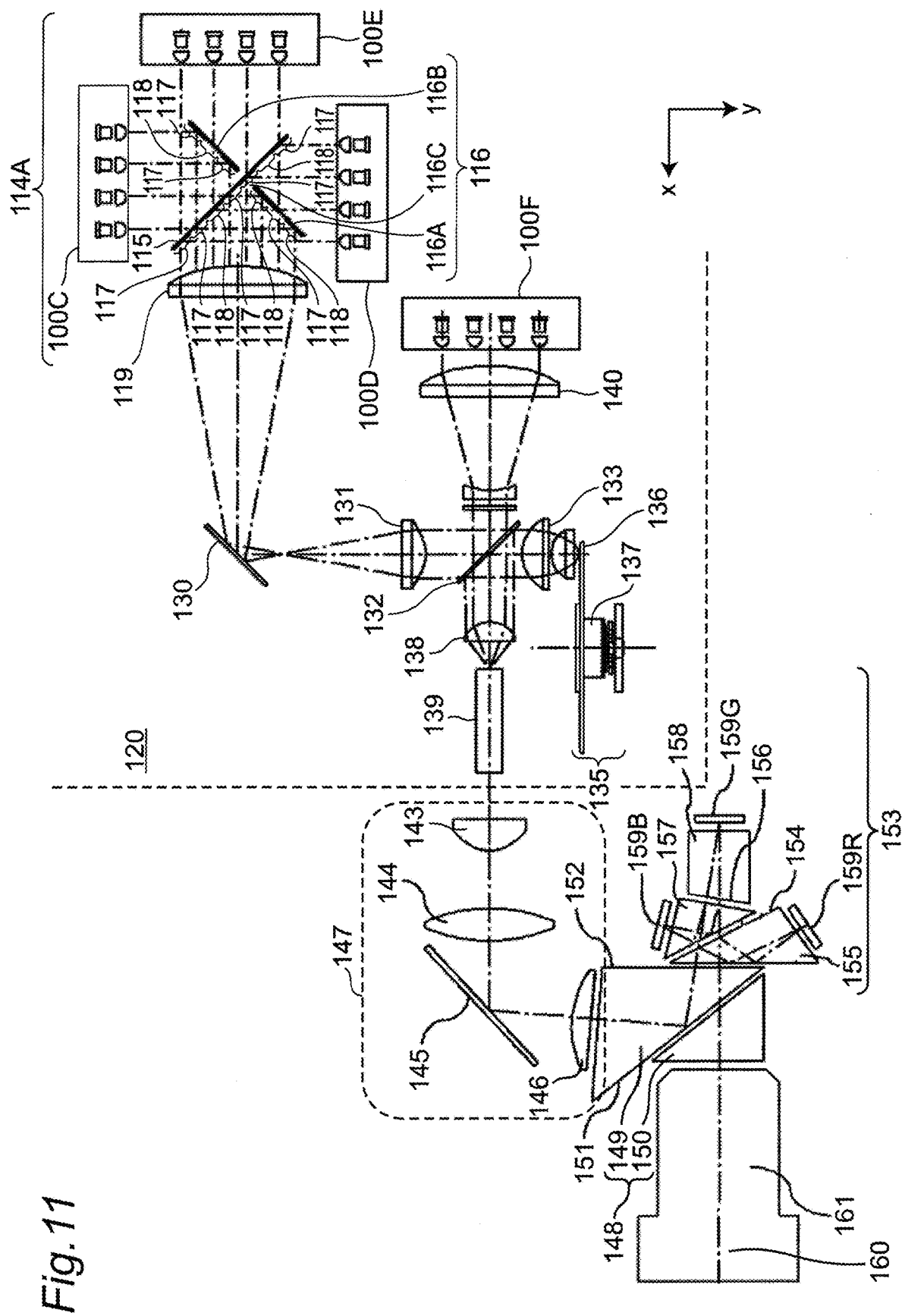
FIG. 11 is a plan view showing a configuration example of a projection type image display apparatus using the illumination apparatus 120 of FIG. 10.

FIG. 11 is a plan view showing a configuration example of a projection type image display apparatus using the illumination apparatus 120 of FIG. 10.

Referring to FIG. 11, the outgoing light from the rod integrator 130 of the illumination apparatus 120 is reflected by a return mirror 145 via relay lenses 143 and 144, and then enters a total reflection prism 148 via a field lens 146. The total reflection prism 148 is formed by fixing a prism 149 and a prism 150 while maintaining a slight gap therebetween. The light incident on the total reflection prism 148 is totally reflected by a surface 151 of the prism 149 and then enters a color prism unit 153 via a surface 152 of the prism 149.

The color prism unit 153 is formed by bonding and fixing:
(1) a prism 155 including a dichroic mirror surface 154 having a characteristic of reflecting blue light.;
(2) a prism 157 including a dichroic mirror surface 156 having a characteristic of reflecting red light; and
(3) a prism 158.

In this case, as shown in FIG. 11, DMDs (digital mirror devices) 159R, 159B, and 159G are provided on end surfaces of the prisms 155, 157, and 158, respectively. In each of the DMDs 159R, 159G, and 159B, minute mirrors are two-dimensionally arranged, and their tilt directions are controlled in two directions according to an image signal from outside. For example, reflected light returns to the color prism unit 153 at an incident angle of 0° at a tilt angle at the time of an ON control signal, and it enters the color prism unit 153 again at a predetermined large angle at the time of an OFF control signal. In this case, the DMD 159B is a DMD for blue light modulation, the DMD 159R is a DMD for red light modulation, and the DMD 159G is a DMD for green light modulation.

In each pixel of the DMDs 159R, 159G, and 159B, light in a white display mode returns to the color prism unit 153 again and enters a projection lens 161 through the prisms 149, 150 of the total reflection prism 148, and then reaches a screen (not shown). In this way, it is possible to obtain a projection type image display apparatus which realizes color display.

Improvement of light intensity in the projection type image display apparatus configured as described above restricted by how densely light from the laser light sources can be focused on a light volume that can be handled by light valves such as the DMDs (the product of a display area and a converging angle of light that can be handled). Therefore, it is very effective to use a technology according to the present disclosure capable of optically synthesizing laser light at high density for the illumination apparatus 120. In addition, as described above, the incident white light is separated into the color light beams of red, blue, and green and then synthesized by the color prism unit 153, and the DMDs (light valves) disposed on color light paths thereof to make it possible to carry out modulation in units of pixels.

The projection type image display apparatus (projector) using the illumination apparatus 120 according to the present disclosure is available by using a device capable of performing the above described function. For example, it can be realized by a liquid crystal system including a color separator such as a dichroic mirror, a display device such as a liquid crystal display device, a cross type color synthesizing prism, and the like. In addition, since it is not essential to the present disclosure, detailed explanation is avoided. However, instead of the above-described three-chip type projector that performs light intensity modulation for each color light of red, blue, and green, a one-chip type projector using a high-speed response light valve capable of separating white light into each color light of red, blue, and green rapidly and time-dividedly and of switching over image signals according to the color light can be also applied.

Third Embodiment

Figure 12:
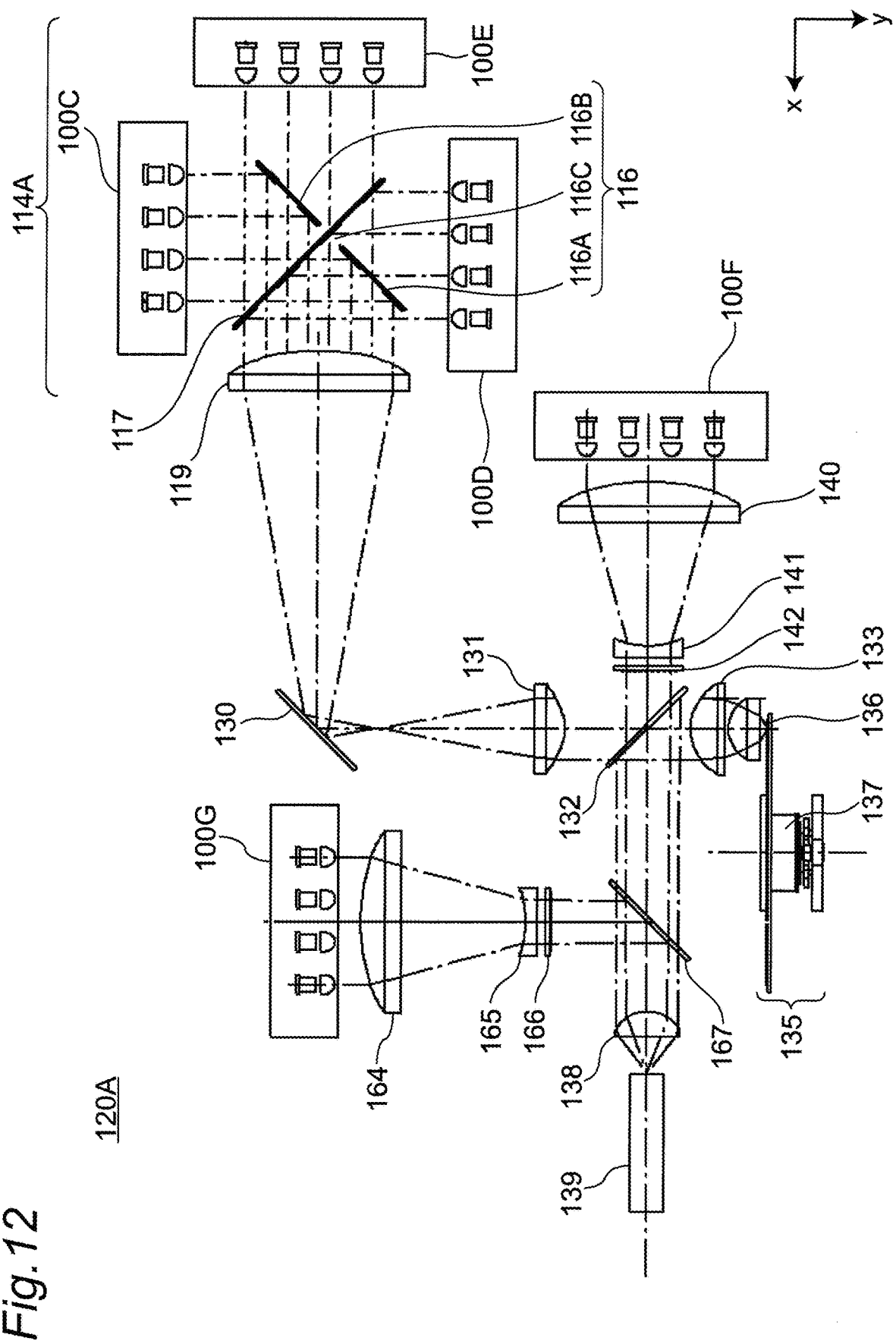
FIG. 12 is a plan view showing a configuration example of an illumination apparatus 120A according to a third embodiment.

FIG. 12 is a plan view showing a configuration example of an illumination apparatus 120A according to a third embodiment. In the third embodiment, a configuration example and developability of a case where a light source wavelength of the illumination apparatus 120A is changed will be described. Referring to FIG. 12, the illumination apparatus 120A according to the third embodiment is different from the illumination apparatus 120 according to the second embodiment of FIG. 10 in the following points:

(1) A phosphor wheel apparatus 135 employs a green phosphor in place of the yellow phosphor; and
(2) A red laser light source unit 100G, lenses 164 and 165, a diffusion plate 166, and a dichroic mirror 167 are further provided.

Hereinafter, the differences will be described in detail.

Referring to FIG. 12, light emitted from the laser light source unit 100G is emitted in a +y direction, converged by the lens 164 provided in front of the laser light source unit 100G, and then converted into substantially parallel light by the lens 165. The substantially parallel light enters the dichroic mirror 167 via the diffusion plate 166. The dichroic mirror 167 is disposed between the dichroic mirror 132 and the lens 138, reflects red light from the laser light source unit 100G, and transmits the other color light. This makes it possible to obtain white light by synthesizing green light from the phosphor wheel apparatus 135, blue light from a laser light source unit 100F, and the red light from the laser light source unit 100G on the same optical axis.

Figure 13:
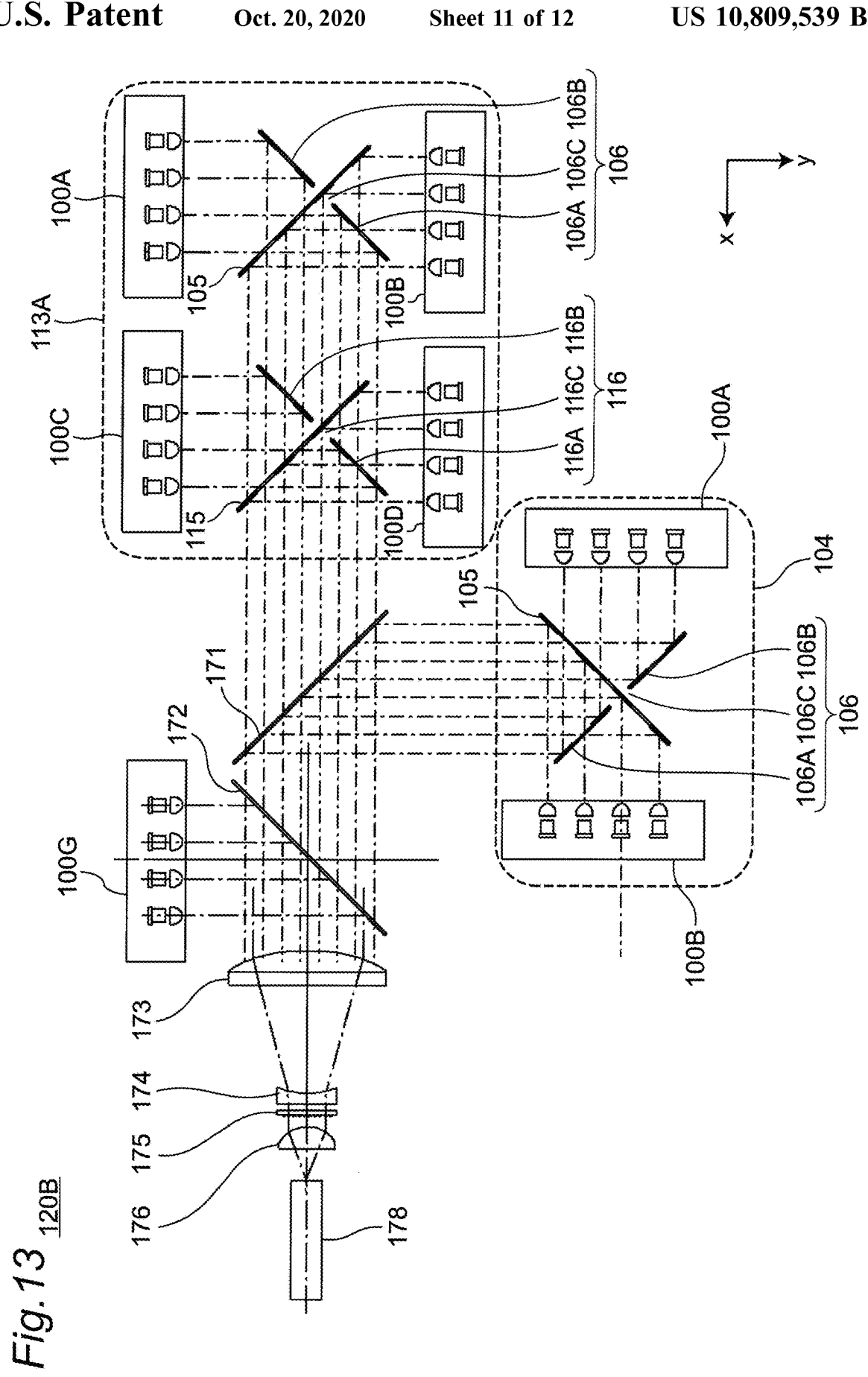
FIG. 13 is a plan view showing a configuration example of an illumination apparatus 120B according to a modified embodiment of the third embodiment.

FIG. 13 is a plan view showing a configuration example of an illumination apparatus 120B according to a modified embodiment of the third embodiment. The illumination apparatus 120B of FIG. 13 shows a configuration example in which white light is obtained without using a phosphor. At present, development of a laser light source proceeds, and both efficiency and output intensity thereof are improved. However, the output intensity is generally in a descending order of a blue laser light source, a red laser light source, and a green laser light source. Therefore, in order to obtain white balance, it is common to use the green laser light source most frequently and use the least number of blue laser light sources.

Referring to FIG. 13, each laser light source unit in each illumination apparatus is set as follows.

(1) An illumination apparatus 113A uses laser light source units 100A to 100D that emit green laser light.
(2) An illumination apparatus 104 uses laser light source units 100A and 100B that emit red laser light.
(3) A laser light source unit 100G in a rear stage emits blue later light.

In addition, an optical system from dichroic mirrors 171, 172 to a rod integrator 178 is provided.

Referring to FIG. 13, the synthesized green light from the illumination apparatus 113A is emitted in a +x direction, and passes through the red reflection dichroic mirror 171, which reflects red light and transmits the other color light. Then, the light passes through the blue reflection dichroic mirror 172 which reflects blue light, and enters a lens 173. In addition, the red light from the illumination apparatus 104 is reflected by the dichroic mirror 171, then passes through the dichroic mirror 172, and is incident on the lens 173. Further, the blue light from the laser light source unit 100G is reflected by the dichroic mirror 172, and then enters the lens 173. Three-color light converged by the lens 173 passes through the lens 173 and a lens 174 configuring an afocal type optical system, and then enters a lens 176 via a diffusion plate 175. Next, the lens 176 allows the incident light to be focused on an incident surface of the rod integrator 178 disposed on an optical axis 177, so that highly uniform illumination light can be obtained on an outgoing surface of the rod integrator 178.

As described above, according to the present embodiment, it is possible to obtain the white light only by the laser light source optical units 100A to 100G without using the phosphor wheel apparatus 135.

Figure 14:
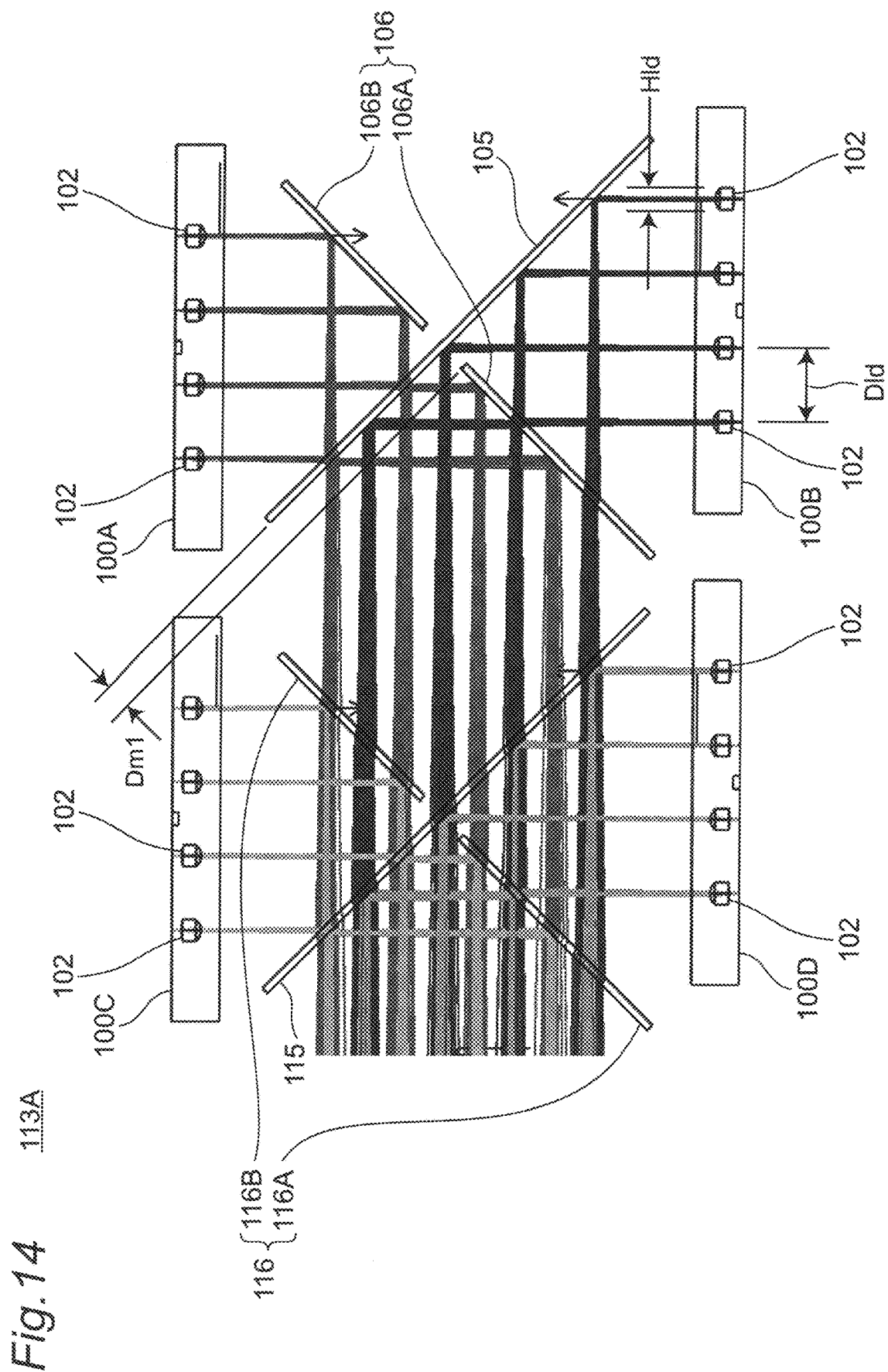
FIG. 14 is a plan view showing an arrangement relationship between components of an illumination apparatus 113A of FIG. 13.

FIG. 14 is a plan view showing an arrangement relationship between components of the illumination apparatus 113A of FIG. 13. In FIG. 14, a beam width of the emitted loser light is taken into consideration. In FIG. 14, definitions are made as follows:

(1) Dml: a distance between an inner end surface of a mirror portion 106A and a surface of a mirror 105;

(2) Dld: a distance between laser optical axes of the laser light source units 100A, 100B on a plane perpendicular to reflection surfaces of the mirrors 105, 106; and (3) Hld: an effective laser light width of each of the laser light source units 100A, 100B on the plane, which is perpendicular to the reflection surfaces of the mirrors 105 and 106.

In this case, the distance Dm 1 is set according to the following equation:

$$Dm1 = \frac{H1d}{2} \times \sqrt{2}. \tag{2}$$

Other Embodiments

In the above embodiments, the integrators 139, 178 are shown as a configuration example of a rod type, but the present disclosure is not limited thereto. A lens array type in which two lens arrays formed by arranging lenses two-dimensionally are disposed coaxially is also possible.

It is noted that a projection type image display apparatus can be realized by disposing a lens array and a projection lens in front of light emission using the illumination apparatus 120, 120A and 120B according to the embodiment.

In the above embodiments, the illumination apparatuses 104, 113, 113A, 114, 114A, 120, 120A and 120B are described. However, the present disclosure is not limited to this, and a plurality of illumination apparatuses may be used as an illumination system.

Referring to FIGS. 10 and 11, the illumination apparatus 114A is used, but the present disclosure is not limited to this. The other illumination apparatus such as the illumination apparatus 113 of FIG. 6 may be used.

It is noted that the dichroic mirrors 132, 171, and 172 of FIGS. 10, 11, 12, and 13 configure an optical multiplexer that synthesizes and outputs a plurality of light beams.

INDUSTRIAL APPLICABILITY

Accordingly, in accordance with the illumination apparatus or the like according to the present disclosure, it is possible to synthesize the light beams of the same wavelength from the light source units disposed opposing each other and increase output intensity of an outgoing light beam compared with the prior art.

What is claimed is:

1. An illumination apparatus comprising:
   first and second laser light source units, each of the first and second laser light source units being configured by juxtaposing a plurality of laser light sources in an array, the first and second laser light source units being provided so as to oppose each other;
   a first reflecting member disposed so as to incline with respect to a plurality of outgoing light beams from the first and second laser light source units, the first reflecting member alternately having, in a juxtaposition direction, a reflecting region reflecting a first outgoing light beam of the plurality of outgoing light beams in an output light direction and a transmitting region transmitting a second outgoing light beam of the plurality of outgoing light beams; and
   a second reflecting member disposed so as to be orthogonal to the first reflecting member, the second reflecting member alternately having, in the juxtaposition direction, a reflecting region reflecting a third outgoing light beam of the plurality of outgoing light beams in the output light direction and a transmitting region transmitting a fourth outgoing light beam of the plurality of outgoing light beams,
   wherein the second reflecting member has a first gap and is divided into first and second reflecting portions,
   wherein the first reflecting member is disposed so as to pass through the first gap,
   wherein the second outgoing light beam transmitted through the transmitting region of the first reflecting member and the fourth outgoing light beam transmitted through the transmitting region of the second reflecting member are reflected in the output light direction by the reflecting region of the second reflecting member and the reflecting region of the first reflecting member, respectively, whereby the reflected light beams are emitted in the output light direction, and
   wherein, when a plate thickness of the first reflecting portion is Mt and an effective width of the laser light beam from each of the laser light sources is Wld, a distance Md between the first reflecting portion and the first reflecting member is set to satisfy the following equation:

$$Md \geq \frac{Mt}{2} + \frac{W1d}{\sqrt{2}}.$$

2. The illumination apparatus as claimed in claim 1, wherein the second reflecting member is disposed such that the first gap is located in the reflecting region of the first reflecting member that reflects one outgoing light beam from the second laser light source unit.

3. The illumination apparatus as claimed in claim 1, wherein each of the reflecting regions of the first and second reflecting members extends in a vertical direction, and a plurality of the reflecting regions is formed so as to be juxtaposed in a horizontal direction.

4. The illumination apparatus as claimed in claim 3, wherein the plurality of laser light sources is disposed such that a width of each laser light beam is larger in the vertical direction than in the horizontal direction.

5. The illumination apparatus as claimed in claim 1, wherein the effective width Wld of the laser light beam from each of the laser light sources is defined by a width at an intensity reduced to $1/e^2$ with respect to a peak intensity of the laser light, where e is a Napier's constant.

6. An illumination system comprising:
an illumination apparatus; and
a third laser light source unit having a plurality of laser light sources arrayed and juxtaposed in a direction orthogonal to a juxtaposition direction of first and second laser light source units,
wherein the illumination apparatus comprises:
the first and second laser light source units, each of the first and second laser light source units being configured by juxtaposing a plurality of laser light sources in an array, the first and second laser light source units being provided so as to oppose each other;
a first reflecting member disposed so as to incline with respect to a plurality of outgoing light beams from the first and second laser light source units, the first reflecting member alternately having, in the juxtaposition direction, a reflecting region reflecting a first outgoing light beam of the plurality of outgoing light beams in an output light direction and a transmitting region transmitting a second outgoing light beam of the plurality of outgoing light beams; and
a second reflecting member disposed so as to be orthogonal to the first reflecting member, the second reflecting member alternately having, in the juxtaposition direction, a reflecting region reflecting a third outgoing light beam of the plurality of outgoing light beams in the output light direction and a transmitting region transmitting a fourth outgoing light beam of the plurality of outgoing light beams,
wherein the second reflecting member has a predetermined first gap and is divided into first and second reflecting portions,
wherein the first reflecting member is disposed so as to pass through the first gap,
wherein the second outgoing light beam transmitted through the transmitting region of the first reflecting member and the fourth outgoing light beam transmitted through the transmitting region of the second reflecting member are reflected in the output light direction by the reflecting region of the second reflecting member and the reflecting region of the first reflecting member, respectively, whereby the reflected light beams are emitted in the output light direction,
wherein the first and second reflecting members further transmit outgoing light beams from the third laser light source unit through other transmitting regions different from the transmitting regions, and
wherein, when a plate thickness of the first reflecting portion is Mt and an effective width of the laser light beam from each of the laser light sources is Wld, a distance Md between the first reflecting portion and the first reflecting member is set to satisfy the following equation:

$$Md \geq \frac{Mt}{2} + \frac{W1d}{\sqrt{2}}.$$

7. The illumination system as claimed in claim 6, wherein the different transmitting regions are formed to be spaced apart from each other at intervals in a vertical direction of the first and second reflecting members.

8. An illumination system comprising:
a first illumination apparatus; and
a second illumination apparatus provided at a rear stage of the first illumination apparatus,
wherein the first illumination apparatus comprises:
first and second laser light source units, each of the first and second laser light source units being configured by juxtaposing a plurality of laser light sources in an array, the first and second laser light source units being provided so as to oppose each other;
a first reflecting member disposed so as to incline with respect to a plurality of outgoing light beams from the first and second laser light source units, the first reflecting member alternately having, in a juxtaposition direction, a reflecting region reflecting a first outgoing light beam of the plurality of outgoing light beams in an output light direction and a transmitting region transmitting a second outgoing light beam of the plurality of outgoing light beams; and
a second reflecting member disposed so as to be orthogonal to the first reflecting member, the second reflecting member alternately having, in the juxtaposition direction, a reflecting region reflecting a third outgoing light beam of the plurality of outgoing light beams in the output light direction and a transmitting region transmitting a fourth outgoing light beam of the plurality of outgoing light beams,
wherein the second reflecting member has a first gap and is divided into first and second reflecting portions,
wherein the first reflecting member is disposed so as to pass through the first gap,
wherein the second outgoing light beam transmitted through the transmitting region of the first reflecting member and the fourth outgoing light beam transmitted through the transmitting region of the second reflecting member are reflected in the output light direction by the reflecting region of the second reflecting member and the reflecting region of the first reflecting member, respectively, whereby the reflected light beams are emitted in the output light direction,
wherein, when a plate thickness of the first reflecting portion is Mt and an effective width of the laser light beam from each of the laser light sources is Wld, a distance Md between the first reflecting portion and the first reflecting member is set to satisfy the following equation:

$$Md \geq \frac{Mt}{2} + \frac{W1d}{\sqrt{2}},$$

wherein the second illumination apparatus includes:
third and fourth laser light source units each of which is configured by juxtaposing a plurality of laser light sources in an array, the third and fourth laser light source units being provided so as to oppose each other;
a third reflecting member disposed so as to incline with respect to a plurality of outgoing light beams from the third and fourth laser light source units, the third reflecting member alternately having, in a juxtaposition direction, a reflecting region reflecting a fifth outgoing light beam of the plurality of outgoing light beams in an output light direction and a transmitting region transmitting a sixth outgoing light beam of the plurality of outgoing light beams and an outgoing light beam from the first illumination apparatus; and
a fourth reflecting member disposed so as to be orthogonal to the third reflecting member, the fourth reflecting member alternately having, both in the juxtaposition direction and in a direction perpendicular to the juxtaposition direction, a reflecting region reflecting a seventh outgoing light beam of the plurality of outgoing light beams in the output light direction and a transmitting region transmitting an eighth outgoing light beam of the plurality of outgoing light beams and the outgoing light beam from the first illumination apparatus,
wherein the fourth reflecting member has a second gap and is divided into third and fourth reflecting portions, wherein the third reflecting member is disposed so as to pass through the second gap, and wherein the sixth outgoing light beam transmitted through the transmitting region of the third reflecting member and the eighth outgoing light beam transmitted through the transmitting region of the fourth reflecting member are reflected in the output light direction by the reflecting region of the fourth reflecting member and the reflecting region of the third reflecting member, respectively, whereby the reflected light beams are emitted in the output light direction.

9. The illumination system as claimed in claim 6, further comprising a phosphor wheel apparatus that converts a color of an outgoing light beam from the illumination system made incident on a phosphor into a different color and emits an outgoing light beam.

10. The illumination system as claimed in claim 6, further comprising:
at least one fifth laser light source unit configured by juxtaposing a plurality of laser light sources in an array; and
an optical multiplexer that outputs by synthesizing an outgoing light beam from the illumination system and an outgoing light beam from the at least one fifth laser light source unit.

11. The illumination system as claimed in claim 6, further comprising:
a phosphor wheel apparatus that converts a color of an outgoing light beam from the illumination system made incident on a phosphor into a different color and emits an outgoing light beam;
at least one fifth laser light source unit configured by juxtaposing a plurality of laser light sources in an array; and
an optical multiplexer that outputs by synthesizing the outgoing light beam from the phosphor wheel apparatus, the outgoing light beam from the illumination system, and an outgoing light beam from the at least one fifth laser light source unit.

12. A projection type image display apparatus comprising an illumination apparatus,
wherein the illumination apparatus comprises:
first and second laser light source units, each of the first and second laser light source units being configured by juxtaposing a plurality of laser light sources in an array, the first and second laser light source units being provided so as to oppose each other;
a first reflecting member disposed so as to incline with respect to a plurality of outgoing light beams from the first and second laser light source units, the first reflecting member alternately having, in a juxtaposition direction, a reflecting region reflecting a first outgoing light beam of the plurality of outgoing light beams in an output light direction and a transmitting region transmitting a second outgoing light beam of the plurality of outgoing light beams; and
a second reflecting member disposed so as to be orthogonal to the first reflecting member, the second reflecting member alternately having, in the juxtaposition direction, a reflecting region reflecting a third outgoing light beam of the plurality of outgoing light beams in the output light direction and a transmitting region transmitting a fourth outgoing light beam of the plurality of outgoing light beams,
wherein the second reflecting member has a first gap and is divided into first and second reflecting portions,
wherein the first reflecting member is disposed so as to pass through the first gap,
wherein the second outgoing light beam transmitted through the transmitting region of the first reflecting member and the fourth outgoing light beam transmitted through the transmitting region of the second reflecting member are reflected in the output light direction by the reflecting region of the second reflecting member and the reflecting region of the first reflecting member, respectively, whereby the reflected light beams are emitted in the output light direction, and
wherein, when a plate thickness of the first reflecting portion is Mt and an effective width of the laser light beam from each of the laser light sources is Wld, a distance Md between the first reflecting portion and the first reflecting member is set to satisfy the following equation:

$$Md \geq \frac{Mt}{2} + \frac{W1d}{\sqrt{2}}.$$

13. A projection image display apparatus comprising an illumination system,
wherein the illumination system comprises:
an illumination apparatus; and
a third laser light source unit having a plurality of laser light sources arrayed and juxtaposed in a direction orthogonal to a juxtaposition direction of first and second laser light source units,
wherein the illumination apparatus comprises:
the first and second laser light source units, each of the first and second laser light source units being configured by juxtaposing a plurality of laser light sources in an array, the first and second laser light source units being provided so as to oppose each other;
a first reflecting member disposed so as to incline with respect to a plurality of outgoing light beams from the first and second laser light source units, the first reflecting member alternately having, in the juxtaposition direction, a reflecting region reflecting a first outgoing light beam of the plurality of outgoing light beams in an output light direction and a transmitting region transmitting a second outgoing light beam of the plurality of outgoing light beams; and
a second reflecting member disposed so as to be orthogonal to the first reflecting member, the second reflecting member alternately having, in the juxtaposition direction, a reflecting region reflecting a third outgoing light beam of the plurality of outgoing light beams in the output light direction and a transmitting region transmitting a fourth outgoing light beam of the plurality of outgoing light beams,
wherein the second reflecting member has a first gap and is divided into first and second reflecting portions,
wherein the first reflecting member is disposed so as to pass through the first gap,
wherein the second outgoing light beam transmitted through the transmitting region of the first reflecting member and the fourth outgoing light beam transmitted through the transmitting region of the second reflecting member are reflected in the output light direction by the reflecting region of the second reflecting member and the reflecting region of the first reflecting member, respectively, whereby the reflected light beams are emitted in the output light direction, wherein the first and second reflecting members further transmit outgoing light beams from the third laser light source unit through other transmitting regions different from the transmitting regions, and wherein, when a plate thickness of the first reflecting portion is Mt and an effective width of the laser light beam from each of the laser light sources is Wld, a distance Md between the first reflecting portion and the first reflecting member is set to satisfy the following equation:

$$Md \geq \frac{Mt}{2} + \frac{Wld}{\sqrt{2}}.$$

* * * * *